United States Patent

[11] 3,611,291

[72] Inventor Alan I. Frank
Philadelphia, Pa.
[21] Appl. No. 870,800
[22] Filed Oct. 30, 1969
[23] Division of Ser. No. 544,202, Apr. 21, 1966, abandoned
[45] Patented Oct. 5, 1971
[73] Assignee Scan-Data Corporation
Philadelphia, Pa.

[54] CHARACTER RECOGNITION SYSTEM FOR READING A DOCUMENT EDITED WITH HANDWRITTEN SYMBOLS
2 Claims, 12 Drawing Figs.

[52] U.S. Cl. .......... 340/146.3 Z, 283/1
[51] Int. Cl. .......... G06k 9/00
[50] Field of Search .......... 35/48; 340/146.3, 172.5, 146.3 A, 146.3 Z; 235/61.115; 283/1, 9

[56] References Cited

UNITED STATES PATENTS

| | | | |
|---|---|---|---|
| 2,963,220 | 12/1960 | Kosten et al. | 340/146.3 A |
| 3,426,324 | 2/1969 | Manly | 340/146.3 B |
| 3,453,419 | 7/1969 | Torrey | 235/61.115 |
| 3,200,194 | 8/1965 | Rabinow | 340/146.3 UX |
| 3,248,705 | 4/1966 | Dammann et al. | 340/172.5 |
| 3,264,618 | 8/1966 | Rabinow | 340/146.3 |
| 3,328,760 | 6/1967 | Beltz | 340/146.3 |
| 3,328,764 | 6/1967 | Sorensen et al. | 340/172.5 |
| 3,370,271 | 2/1968 | Van Dalen et al. | 340/146.3 |
| 3,408,458 | 10/1968 | Hennis | 340/146.3 X |

OTHER REFERENCES

Marcus, HDL Technical Disclosure Bulletin, " 8–4–2–1 Binary to 9 Segment Numeric Readout Conversion Matrix," March 2, 1964. No. 2.

*Primary Examiner*—Maynard R. Wilbur
*Assistant Examiner*—Leo H. Boudreau
*Attorney*—Caesar, Rivise, Bernstein & Cohen

ABSTRACT: A method and apparatus for editing a document having textual material thereon. A unique font of editing symbols is provided which are handwritable yet recognizable by a character recognition system. Each of the symbols is representative of an editing instruction. An appropriate symbol is inserted adjacent each portion of the textual material which is in error. The document is then inserted into a character recognition system without requiring reproduction of the document with the alterations incorporated.

INVENTOR.
ALAN I. FRANK
BY
Caesar, Rivise,
Bernstein & Cohen
ATTORNEYS.

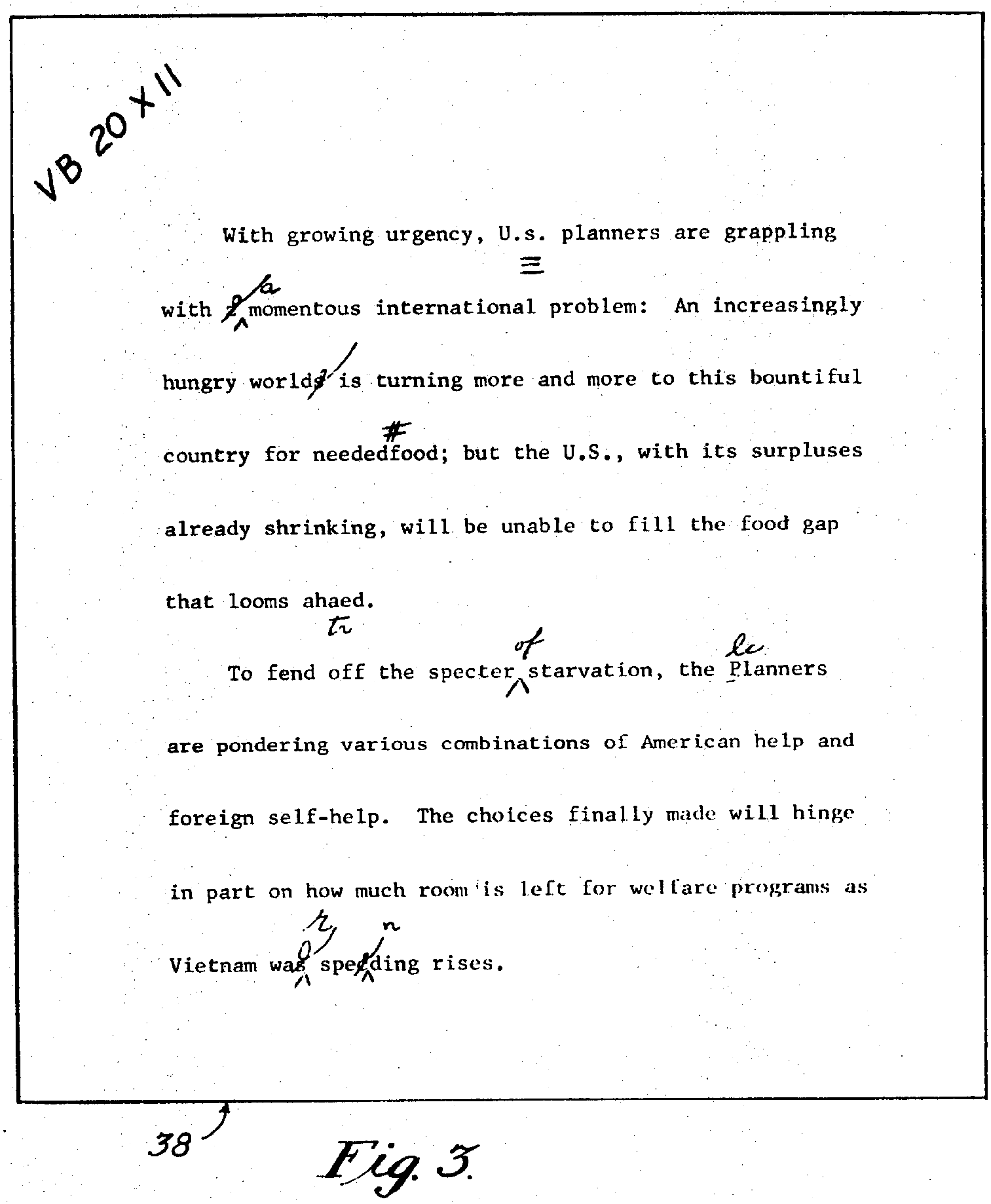
VB 20 X 11

With growing urgency, U.s. planners are grappling with a momentous international problem: An increasingly hungry worlds is turning more and more to this bountiful country for neededfood; but the U.S., with its surpluses already shrinking, will be unable to fill the food gap that looms ahaed.

To fend off the specter starvation, the Planners are pondering various combinations of American help and foreign self-help. The choices finally made will hinge in part on how much room is left for welfare programs as Vietnam was spedding rises.

38

Fig. 3.

INVENTOR
ALAN I. FRANK
BY
Caesar, Rivise,
Bernstein & Cohen
ATTORNEYS.

INVENTOR
ALAN I. FRANK
BY
Caesar, Rivise, Bernstein & Cohen
ATTORNEYS.

INVENTOR
ALAN I. FRANK
BY
Caesar, Rivise,
Bernstein & Cohen
ATTORNEYS.

INVENTOR.
ALAN I. FRANK
BY
Caesar, Rivise, Bernstein & Cohen
ATTORNEYS.

INVENTOR.
ALAN I. FRANK
BY
Caesar, Rivise,
Bernstein & Cohen
ATTORNEYS.

INVENTOR
ALAN I. FRANK
BY
Caesar, Rivise, Bernstein & Cohen
ATTORNEYS.

INVENTOR.
ALAN I. FRANK
BY
Caesar, Rivise, Bernstein & Cohen
ATTORNEYS.

INVENTOR
ALAN I. FRANK
BY
Caesar, Rivise,
Bernstein & Cohen
ATTORNEYS.

CHARACTER RECOGNITION SYSTEM FOR READING A DOCUMENT EDITED WITH HANDWRITTEN SYMBOLS

This invention relates to character recognition and more particularly to a method of editing a document prior to optical scanning thereof in a character recognition system and this is a division of application Ser. No. 544,202, filed Apr. 21, 1966, now abandoned.

The use of character recognition techniques to recognize and read into computers printed copy is becoming more and more commonplace. Optical scanning as well as other character recognition systems, however, have been fairly limited to the use of printed data. The reason being that handwriting varies greatly from one person to the next. Thus, where data is not printed or typewritten form, it is necessary to reproduce the data in such a form so that it may be recognized by character recognition equipment for insertion into the memory of a large scale computer or be used by printing machinery, etc. Similarly, where mistakes appear in printed data, it is necessary that the data be retyped in perfect form in order that the recognition equipment can receive the altered data. Thus, an entire sheet of data may be perfectly usable with the exception of a single line, yet the entire sheet of printed data must be retyped or printed to incorporate the amendment or deletion to the line.

It is, therefore, an object of this invention to provide a new and improved editing technique which enables the edited copy to be directly read into a machine by optical scanning techniques.

It is another object of this invention to provide a new and improved editing technique which utilizes an easily recognizable editing code.

Another object of the invention is to provide a font of editing symbols which enable a sheet of textual material to be corrected or altered without requiring manual reproduction of the material for conversion by a character recognition system into machine language.

Another object of this invention is to provide a new and improved method of altering textual material for reading the altered material directly by an optical scanning device.

Another object of this invention is to provide a new and improved method of reading altered textual material into a machine.

It is another object of the invention to provide a new and improved character recognition system which may read printed textual material having alterations and modifications handwritten therein.

These and other objects of the present invention are achieved by providing a font of editing symbols, each of said symbols being comprised of a portion of a symbol comprising a vertically extending upright bar, a pair of horizontally extending top bars which extend to opposite sides of said upright bar from the top thereof, a pair of horizontally extending center bars which extend to opposite sides of said upright bar from the center thereof, and a pair of horizontally extending bottom bars which extend to opposite sides of said upright bar from the bottom thereof, whereby each of said editing symbols is comprised of said upright bar and a combination of the presence and absence of said horizontal bars.

In accordance with the invention, a font of editing symbols is provided which are easily recognizable by a character recognition system though handwritten. The symbols are comprised of a vertical bar and the combinatorial presence and absence of six horizontal bars which extend from the vertical upright bar. These editing symbols are used in conjunction with textual material by insertion of a proper one of the symbols underneath the portion of textual material which is in error. After the appropriate symbols have been inserted throughout to amend or alter the textual material, the page of textual material and handwritten symbols may then be read by a character recognition system which will automatically edit the textual material in accordance with the editing symbols.

Other objects and many of the attendant advantages of this invention will be readily appreciated as the same becomes better understood by reference to the following detailed description when considered in connection with the accompanying drawings wherein:

FIG. 3 is a plan view of a sheet of textual material as edited by a standard editing technique;

Figure 1:
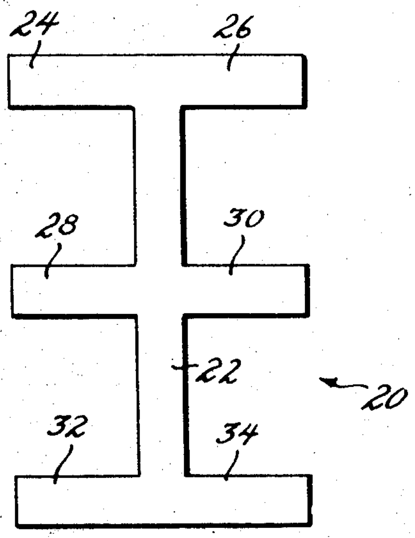
FIG. 1 is an enlarged plan view of the basic editing symbol from which the font of editing symbols is comprised.

Referring now in greater detail to the various figures of the drawings wherein similar reference characters refer to similar parts, the editing symbol embodying the present invention is generally shown at 20 in FIG. 1. The editing symbol 20 is basically comprised of a vertical upright bar 22 which extends from the bottom to the top of the editing symbol. The symbol also includes six horizontal bars 24, 26, 28, 30, 32 and 34. The first pair of horizontal bars 24 and 26 extend laterally from the top of upright bar 22 to the left and right sides, respectively. The pair of bars 28 and 30 extend laterally from the center of upright bar 22 to the left and right, respectively. Finally, the pair of bars 32 and 34 extend from the bottom end of upright bar 22 to the left and right sides, respectively.

Figure 2:
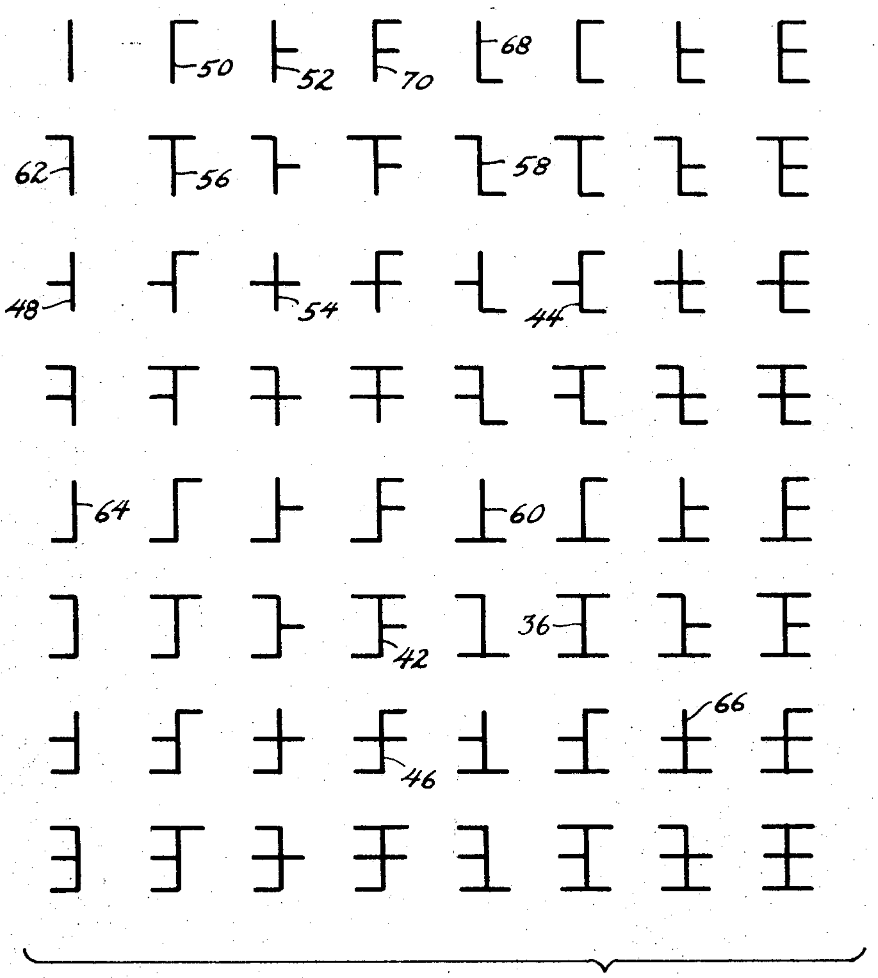
FIG. 2 is a font of editing symbols comprised of the editing symbol shown in FIG. 1.

The editing symbol 20 is the basic structure for a font of handwritten symbols which are formed as a combination of the upright bar 22 and a combination of the presence and absence of bars 24 to 34. This font of symbols is shown in FIG. 2. As can be seen, there are 64 symbols which can be comprised of the editing symbol shown in FIG. 1. That is, the number of combinations which can be derived from the presence and absence of six bars is $2^6$ or 64. As will be seen hereinafter, the provision of an editing symbol having only a single vertical bar and a plurality of horizontal bars facilitates the easy recognition of the symbol.

Each of the symbols in FIG. 2 may be used to represent either an editing instruction, an alphabetic insertion or a linecasting instruction. Thus, the editing symbol 36, which is comprised of a vertical bar 22 and horizontal bars 24, 26, 32 and 34 and which is shown in the third column from the right and third row from the bottom in FIG. 2, may be used as an editing instruction to indicate a capital letter is required rather than a lower case. That is, where textual material is printed with a mistake such as not capitalizing the first letter of a proper noun, the editing symbol 36 may be written underneath the first letter of the word which needs capitalization. In this manner, when the textual material is inserted in the character recognition system of the invention, the editing symbol 36 instructs the system to alter the textual material in accordance with the instruction. Thus, rather than the machine printing a lower case letter, a capital letter is printed instead.

In standard systems for editing textual material, it has been necessary to edit all of the material and then retype or print the material incorporating the revisions prior to having the material read by character recognition equipment. Thus, in the following example, it can be seen that by use of the novel system of this invention, no extra work is required in editing textual material, yet the textual material may be read directly into a character recognition system without requiring a perfect sheet of copy.

In the example hereinafter cited comparing the present system to that presently used by the Government Printing Office, it can be seen that the manner in which the editing of textual material may be accomplished is fairly similar. The following is a chart of some of the symbols used by the Government Printing Office and those symbols embodying the invention which can be used to perform the same function:

SYMBOLS FOR EDITING AND LINECASTING

| Function | GPO symbols | Editing symbols |
|---|---|---|
| Caps | ≡ | I |
| Deletion only | ↩ | + |
| Start of deletion | } ∧ | { ⊣ |
| Start of insertion | | ⊥ |
| End of insertion | | ⊢ |
| Insert space | # | T |
| Transpose | tr | Z |
| Lower case | lc | ± |

The following are examples of alphabetic insertions and graphic arts instructions which may be inserted with editing symbols embodying the invention:

Alphabetic Insertions:

a=┌ n=|⊏ r=└
f=┘ o=┐

Linecasting instructions:

Vogue Bold=⊤⊢
20 point=-|⊏
11 pica line=⊐|⊏

It should be understood that the editing symbols shown above are exemplary only and other symbols may be used for the same functions and the editing symbols shown may be used for other functions. The same symbol may be used not only for an editing instruction, but also for an alphabetic insertion or linecasting instruction. That is, there are only 64 editing symbols which may be made from the vertical bar 22 and horizontal bars 24 through 34 of the basic editing symbol 20. Thus, if the total number of instructions, alphabetic insertions and linecasting instructions are greater than 64 in number, it is necessary to use the editing symbols in more than one manner.

The manner in which the symbol is used can be determined by either its location or the adjacent editing symbols. For instance, an alphabetic insertion is always used after an editing instruction symbol. Therefore, the editing instruction symbol enables the computer to determine that the following symbol thereafter is an alphabetic insertion. It should also be understood that editing symbols may be used not only for alphabetic and graphic arts insertions, but numerical insertions and other symbols as well.

Also, the sensing of the linecasting instructions in a position other than within the text as will be seen hereinafter enables determination by the computer that the symbol is specifically to be used as a graphic arts instruction as opposed to an alternation of the textual material. The use of the editing symbols will be more clearly seen in conjunction with the example hereinafter shown.

Figure 4:
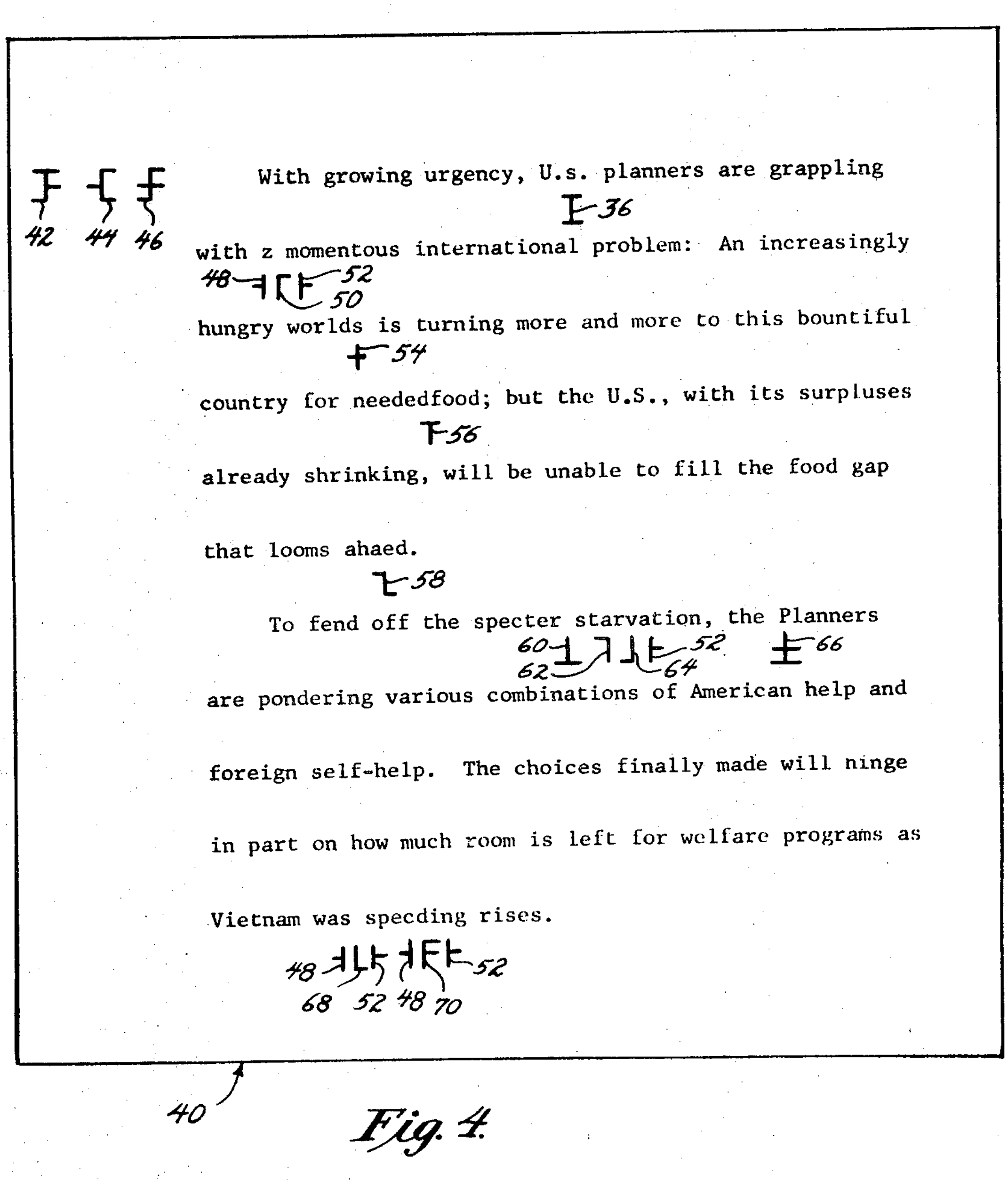
FIG. 4 is a plan view of a sheet of the same textual material as that shown in FIG. 3 as edited in accordance with the invention.

In FIG. 3 and FIG. 4, there is shown a sheet 38 and 40, respectively, of textual material which has been edited by the use of Government Printing Office (hereinafter abbreviated to GPO) symbols and by use of the editing symbols of the invention, respectively. The textual material should read as follows:

With growing urgency, U.S. planners are grappling with a momentous international problem: An increasingly hungry world is turning more and more to this bountiful country for needed food; but the U.S., with its surpluses already shrinking, will be unable to fill the food gap that looms ahead.

To fend off the specter of starvation, the planners are pondering various combinations of American help and foreign self-help. The choices finally made will hinge in part on how much room is left for welfare programs as Vietnam war spending rises.

Thus, in FIG. 3, the GPO symbols are interspersed throughout the textual material in order to alter and amend the errors. In the upper left-hand corner of sheet 38, the notation VB 20X11 is shown. This notation in GPO editing instructions indicates the following instructions to those in the graphic arts, such as linecasters:

Print the textual material in Vogue Bold with a 20-point and 11-pica line.

In FIG. 4, the same instruction is indicated in the top left-hand corner by editing symbols 42, 44 and 46. Symbol 42 is comprised of the vertical upright bar 22 and the presence of horizontal bars 24, 26, 30 and 32 and the absence of the remaining bars (28 and 24). Editing symbol 44 is comprised of the vertical upright bar 22 and the presence of horizontal bars 26, 28 and 34. Editing symbol 46 is comprised of the vertical upright bar 22 and the presence of horizontal bars 26, 28, 30 and 32.

Editing symbol 42, as previously mentioned, indicates a linecasting instruction of Vogue Bold. The editing symbol 44 is the instruction for 20 point and editing symbol 46 is the linecasting instruction for 11-pica line.

Thus, it can be seen that the editing symbols of the invention may be used similarly to GPO abbreviations to indicate the manner in which the textual material will be printed.

Referring to FIG. 3, the first line of textual material in sheet 38 is in error in that the small s in the abbreviation U.S. should be a capital S. This mistake is indicated by the GPO symbol of three parallel lines handwritten below the letter in error which indicates that a capital letter S should replace the lower case letter s.

As was previously indicated, the symbol 36 may be placed underneath the small *s* on the first line of sheet 40 in FIG. 4 to indicate that a capital S should be inserted therefor.

An error appears on the second line on sheets 38 and 40 in that the letter *z* should be an *a*. The GPO method of editing such an error would be to pencil the GPO symbol ϑ through the letter *z* and inserting after the deleted letter the GPO start of an insertion symbol ∧. The letter *a* is then placed above the GPO symbol ∧.

On the second line of sheet 40, the *z* is corrected to an *a* by inserting the editing symbol 48 underneath the *z*. Editing symbol 48 indicates that the letter above it should be deleted. The editing symbol 48 is followed by editing symbols 50 and 52. Editing symbol 50 indicates that the letter *a* should be inserted and editing symbol 52 indicates that there are no further letters to be inserted in place of the deleted *z*.

On the third line of sheets 38 and 40, the word "worlds" should be "world." The GPO symbol ⌄ indicating a deletion is written through the *s* to indicate that the word should be "-world."

On sheet 40, the editing symbol 54 which indicates that a deletion only should be made is inserted under the *s* in "-worlds," thus, indicating the deletion thereof.

The fourth line of sheets 38 and 40 is in error in that "-needed" and "food" should be separated. This is indicated by the GPO symbol # for inserting a space.

On sheet 40, the editing symbol 46 is inserted underneath the second *d* and the *f* in "neededfood" to indicate that a space should be inserted between the letter *d* and the letter *f*.

The next line of textual material on both sheets 38 and 40 does not contain any errors and therefore no editing symbol is necessary in either system.

On the next line, the word "ahaed" is in error in that the *a* and the *e* are not in the proper order. On sheet 38, the GPO symbol for transposing is placed underneath the *ae*.

On sheet 40, the editing symbol 58 is inserted underneath the *ae* to indicate that a transposition of the *a* and the *e* is necessary.

On the next line, which is the first line of the second paragraph, there is an error in that the word "of" should be inserted between "spector," and "starvation," and the first letter *p* in the word "Planners" should be a lower case. The first error on the line is corrected on sheet 38 by the insertion of the GPO symbol ∧ for the start of an insertion between the words "specter" and "starvation" and the insertion of the word "of" above the symbol.

On sheet 40, the symbol 60 is placed below the space between the words "specter" and "starvation" to indicate the start of an insertion, and the symbols 62, 64 and 58 follow to indicate that the letters *o* and *f* should be inserted between "-specter" and "starvation."

On sheet 38, the GPO symbol *lc* to indicate lower case is inserted above the *p* in "Planners" to correct the case error.

On sheet 40, the correction of the capital *P* to a lower case *p* is indicated by editing symbol 66 which is placed beneath the *P* and indicates that a lower case *p* should be substituted therefor.

The next three lines do not contain any errors and are therefore not edited. However, on the last line of sheets 38 and 40, the words "was speeding" should read "war spending." On sheet 38, the line is corrected by writing the GPO deletion symbol the *s* and through the *c* and inserting the GPO symbol ∧ for the start of an insertion after each of these deletion symbols. The letters *r* and *n* are then inserted over the first and second start of insertion symbols, respectively, to indicate that they replace the *s* and *c*, respectively.

On the last line of sheet 40, the editing symbol 48 is inserted underneath the letter *s* in the word "was" and underneath the letter *c* in the word "specding." The first symbol 48 is followed by editing symbols 68 and 52. The second editing symbol 48 is followed by editing symbols 70 and 52. These symbols are inserted after the symbol 48 which indicates the start of a deletion to indicate that the *s* and *c* are to be replaced, respectively, by an *r* and an *n*.

It can thus be seen from the description of the editing of sheets 38 and 40 that the manner of editing textual material by use of editing symbols of the invention is very similar to the use of editing symbols in a conventional system such as that used by the Government Printing Office.

The symbols are easy to write and are very flexible. Thus, the symbols may be used not only for instructions for altering or deleting, but for use to indicate alphabetic insertions, linecasting instructions as well as other insertions or instructions.

Figure 5:
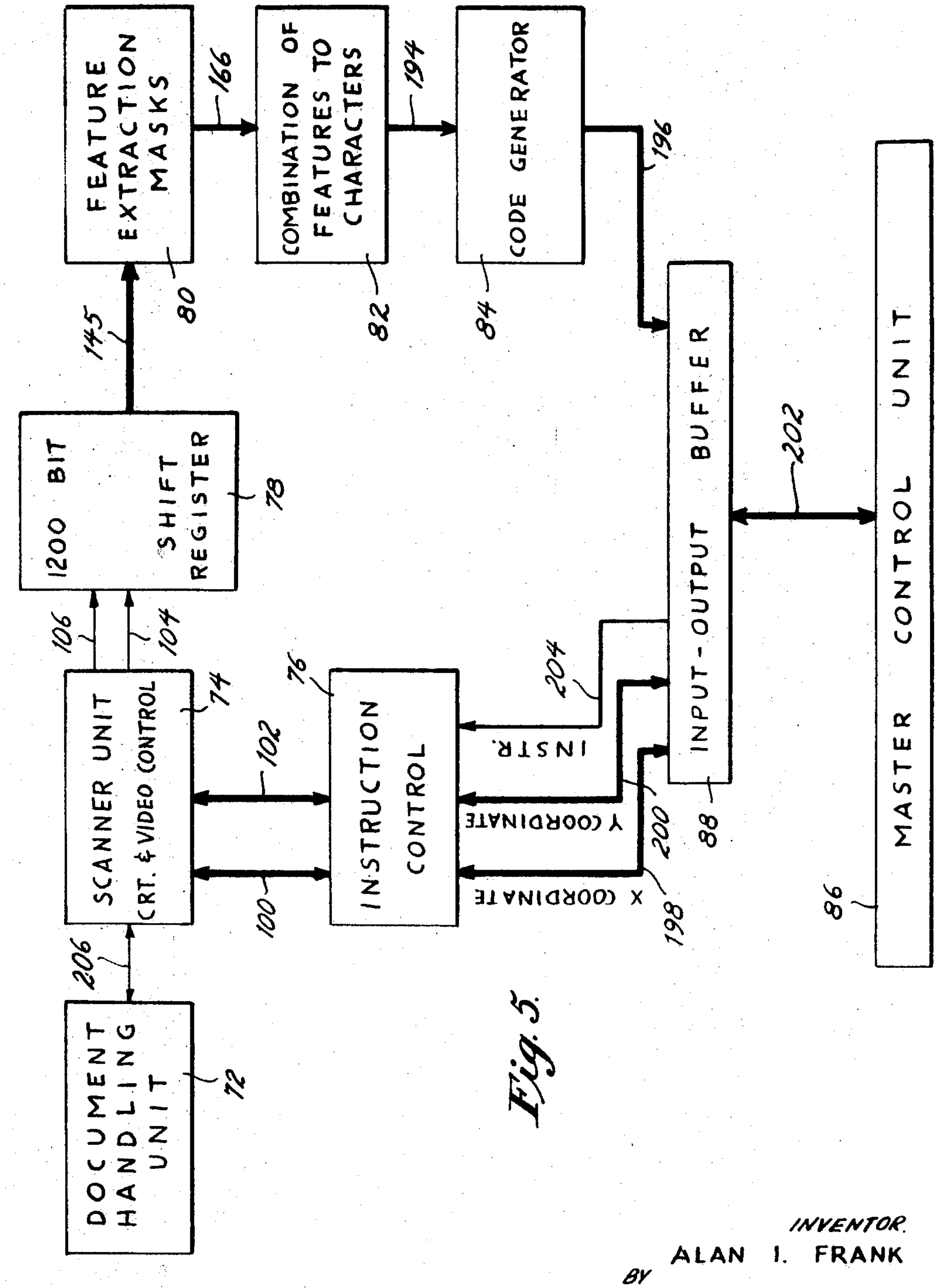
FIG. 5 is a schematic block diagram of an optical scanning system embodying the invention.

The schematic block diagram of a system which may be used to optically scan the edited sheet 40 is shown in FIG. 5. The system includes a document handling unit 72, a scanner unit 74, an instruction control unit 76, a cross-correlation unit comprising a shift register 78, a feature extraction masks 80 and logic circuitry comprised of the combination of features to characters circuits 82, and the code generator 84, a master control unit 86 and an input-output buffer unit 88.

The document handling unit 72 basically comprises a rotating cylindrical platen and a document input unit which feeds the incoming documents to the platen. The rotating platen supports the documents and is adjacent the scanner unit 74. Scanner unit 74 is a flying spot scanner and basically comprises a cathode-ray tube which is controlled by a video control unit. Unit 74 further includes a photomultiplier tube and a pulse-shaping circuit. The cathode-ray tube supplies a raster of light which is directed at the document which is presently in position for being read on the rotating platen of the document handling unit 72. The size of the raster and the location thereof are determined by the inputs on lines 100 and 102. Lines 100 and 102 are connected between the scanner unit 74 and the instruction control unit 76.

The lines 100 and 102 actually indicate a plurality of lines as indicated by their thickness. Throughout FIG. 5 those lines which are heavy indicate that the line is actually a cable having a plurality of input or output lines in multiple. The horizontal positioning of the cathode-ray tube raster is determined by the inputs on lines 100. The horizontal size of the raster is also controlled by the instructions fed to the scanner unit on lines 100.

The size and location of the vertical position of the raster in the cathode-ray tube of scanner unit 74 is determined by the inputs on lines 102 from the instruction control unit 76. The horizontal and vertical locations of the raster are also fed back via lines 100 and 102 to the instruction control unit. The locations are in turn fed to the master control unit via input and output buffer unit 78 so that the horizontal and vertical position or coordinates of a character are stored with the character when it is recognized, as will hereinafter be seen.

The cathode-ray tube in the scanner unit 74 forms the output of the flying spot scanner system which emits a beam of light which is directed to the document being read on the document handling unit 72. The beam is appropriately directed by a lens system between the cathode-ray tube and the document. The beam is scanned in a raster which is slightly larger than the largest character which is to be scanned. In the present embodiment, the preferred raster includes 30 vertical scans. The photomultiplying tube in the scanner unit 74 is connected to a pulse shaper which samples the output from the photomultiplying tube at predetermined intervals. That is, as the cathode-ray tube emits a beam of light in a vertical column along the surface of a document, the photomultiplier tube emits a signal in accordance with the reflection of the beam of light on the surface of the document. Thus, if the beam is reflected off a white area of the document, the output of photomultiplier tube is at one level. Whereas, the location of the beam from the cathode-ray tube on a black surface of the document such as a character produces a different signal level output from the photomultiplier. The pulse shaper samples the photomultiplier output at discrete intervals so that pulses are produced indicative of either a white surface or a black surface as the cathode-ray tube beam scans the surface of the document.

In the preferred embodiment, the pulse shaper samples the output of the photomultiplier tube 40 times in each of the columns. Thus, for each raster of illumination that the cathode-ray tube produces onto the surface of a document, the pulse shaper will produce 1,200 (30 columns × 40 samples per column) discrete outputs. The pulse shaper also includes appropriate gating so that unless a certain threshold of illumination is reflected to the photomultiplier, the output indicates that a black area has been scanned. In this manner, a digital output is produced. The output of the pulse shaper is therefore either one of two levels; the first level indicating that the area scanned is predominantly black at the sampled location and a second level indicating the sampled location is predominantly white.

Thus, if the beam from the cathode-ray tube scans a surface which is partially black and partially white at the time that the photomultiplier output is sampled, then the threshold circuitry within the pulse shaper enables the generation of a discrete digital output of either one level or another. The output from the pulse shaper is fed via line 104 of scanner unit 74 to the shift register 78. Shift register 78 is capable of storing 1,200 bits. That is, the output from the scanner unit 74 for a complete character scan on a document in the document handling unit 72 may be stored in the shift register.

Figure 6:
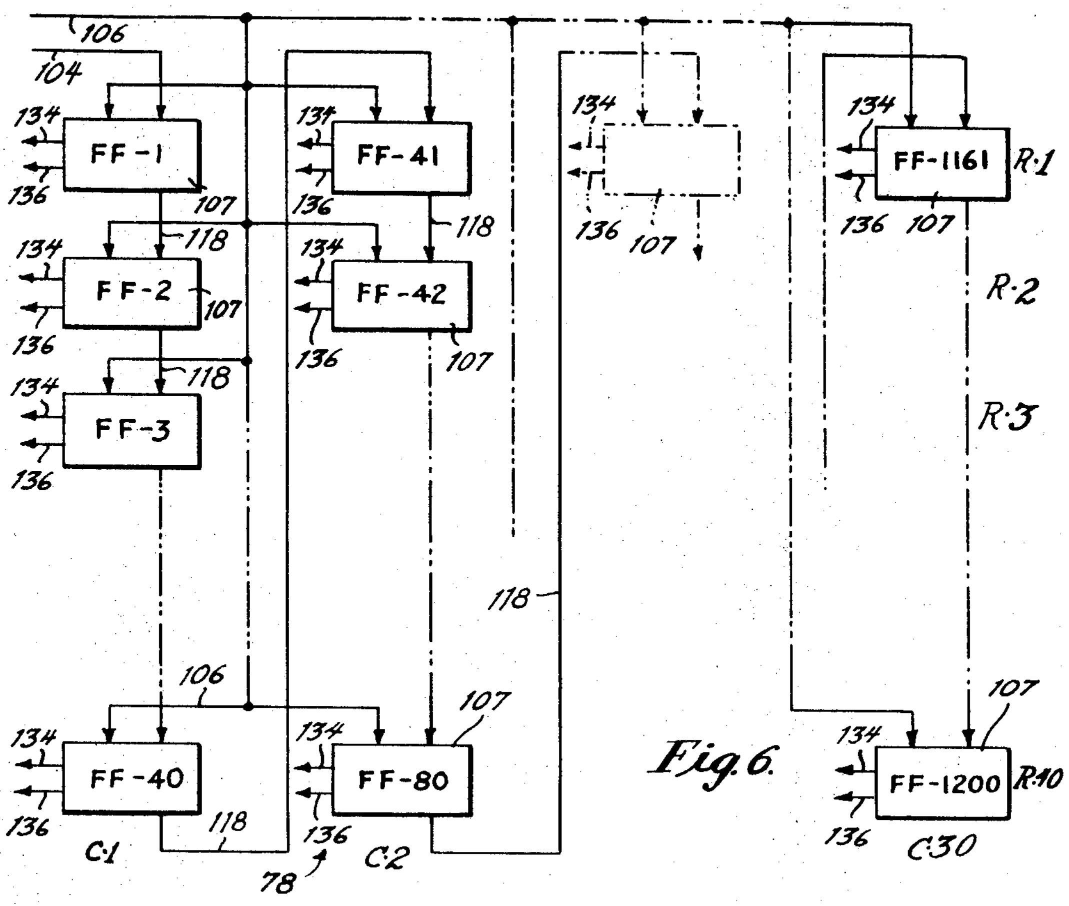
FIG. 6 is a schematic block diagram of the shift register used in the system.

The shift register includes 1,200 flip-flops which are serially connected as shown in FIG. 6. The flip-flops are shown in 30 vertical columns labeled C–1, C–2...C–30 and 40 horizontal rows labeled R–1, R–2, R–3...R–40 in accordance with the location of the samples in the scanning raster. The first column C–1 is comprised of flip-flops FF–1, FF–2, FF–3...FF–40. These flip-flops are serially connected. That is, the output of FF–1 is connected to the input of FF–2, the output of FF–2 is connected to the input of FF–3...and the output of FF–39 is connected to the input of FF–40. The output of flip-flop FF–40 is connected to the input of FF–41 which is located at the top of the second column C–2. FF–41 through FF–80 comprise the second column and are similarly serially connected. The output of FF–80 is connected to the input of FF–81 and so on through to the thirtieth column C–30. There are, thus, 30 columns of 40 flip-flops. Each of the 40 flip-flops in a column corresponds to the points along a vertical column of a raster at which the output of the photomultiplier tube in the scanner unit 74 are sampled by the pulse shaper unit.

The pulse shaper unit samples the output of the photomultiplier in accordance with signals fed by a clock pulse source which also feeds shift pulses via line 106 to the shift register 78. The line 106 is connected to the input of each of flip-flops FF–1 to FF–1200. Thus, as the stream of pulses representing the sampled output of the photomultiplier are fed to line 104 of the shift register 78, the pulses on line 106 advance the information through the shift register. It should be understood that the shift register 78 need not be physically positioned in 30 columns of 40 flip-flops. The flip-flops FF–1 through FF–1200 may be positioned so that the flip-flops are in a single line from FF–1 through FF–1200 or in any other physical location. It is not necessary that the flip-flops be positioned in accordance with the location of the sampled raster. The necessity of positioning the flip-flops in a rectangular pattern is obviated by use of electronic extraction masks which are connected to the output of the flip-flops irrespective of their locations.

Figure 7:
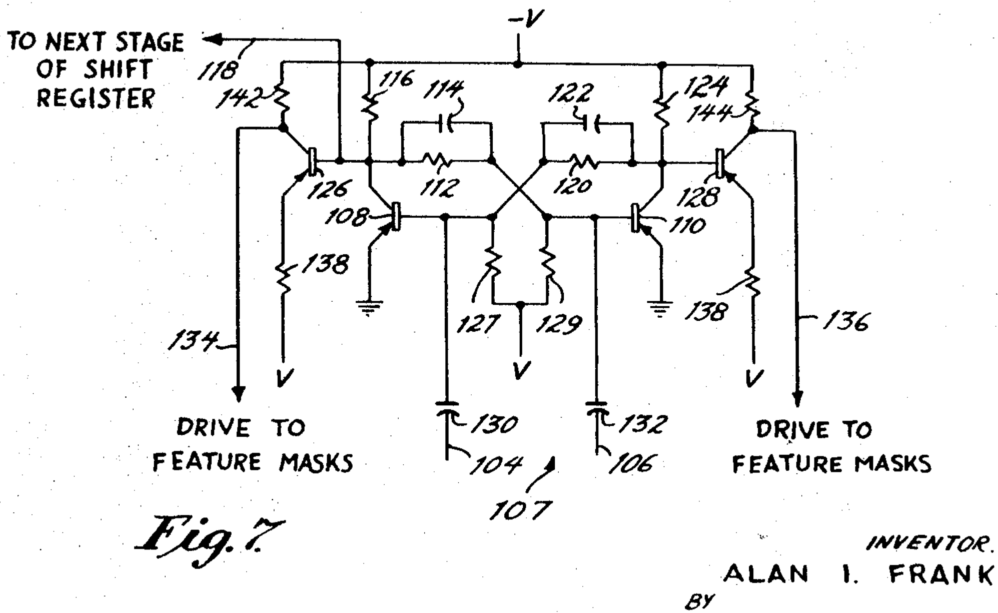
FIG. 7 is a schematic diagram of the flip-flop circuitry used throughout the shift register.

Each of the flip-flops FF–1 through FF–1200 is comprised of a flip-flop circuit 107 which includes a bistable flip-flop circuit having buffer amplifiers connected to the output thereof as shown in FIG. 7. The bistable portion of the circuit shown in FIG. 7 is an Eccles-Jordan-type flip-flop that is comprised of transistors 108 and 110 and the associated circuitry connected therebetween.

The emitters of transistors 108 and 110 are each connected to ground. The collector of transistor 108 is connected to the base of transistor 110 via a resistor 112 and a capacitor 114 which are connected in parallel. The collector of transistor 108 is also connected to a negative source of voltage (−V) via resistor 116 and to the input of the next stage via line 118. The collector of transistor 110 is connected to the base of transistor 108 via resistor 120 and capacitor 122 which are connected in parallel and to the negative source of voltage (−V) via resistor 124. The collectors of transistors 108 and 110 are also connected to the bases of transistors 126 and 128, respectively, which act as amplifiers to drive the feature extraction masks is the feature extraction masks unit 80. The bases of transistors 108 and 110 are connected to a positive source of voltage (V) via resistors 127 and 129, respectively. The base of transistor 108 is also connected to capacitor 130 which is connected to the output line from the previous transistor stage. That is, the output line 118 of a previous flip-flop 107 is connected to the input of capacitor 130 except in the case of flip-flop FF–1, the capacitor 130 is connected to input line 104 from the scanner unit 74. The base of transistor 110 is connected to capacitor 132. The capacitor 132 is connected to the line 106 which receives the shift pulses and shifts the contents of the shift register 78 from one stage to the next.

The collector of transistor 126 is connected to an output line 134 which is fed to the various feature masks which are associated with a particular stage of the shift register 78. Similarly, the collector of transistor 128 is connected to output line 136 which is also connected to various feature masks which are associated with that particular stage of shift register 78. The emitters of transistors 126 and 128 are connected via resistors 138 and 140, respectively, to a positive source of voltage (V). The collectors of transistors 126 and 128 are also connected via resistors 142 and 144, respectively, to the negative source of voltage (−V).

As previously mentioned, the flip-flop comprised of transistors 108 and 110 is a bistable circuit. That is, either transistor 108 or transistor 110 conducts while the other is cut off. Assuming transistor 108 is conducting the transistor 110 is cut off by the voltage on the collector of transistor 108 which is fed to the resistor divider comprised of resistors 112 and 129 which back biases the emitter-base junction of transistor 110. Similarly, when transistor 110 conducts, the collector voltage of transistor 110 back biases the emitter-base junction of transistor 108 so that it is cut off. Assuming transistor 110 is conducting, an input pulse to capacitor 132 back biases the emitter-base junction of transistor 110 so that it is cut off. The change in output voltage on the collector of transistor 110 thereby enables transistor 108 to begin conduction. If, however, transistor 110 were cut off prior to reception of a pulse to capacitor 132, the transistor 110 would be driven further into a cut off region and the state of the flip-flop remains unchanged. Similarly, if transistor 108 is conducting and an input pulse is applied to capacitor 130, the transistor 103 is cut off and the rise in collector voltage turns off transistor 110. An input pulse to capacitor 130, when transistor 108 is cut off, merely drives the transistor 108 further into cutoff and the state of the flip-flop is unchanged.

Thus, it can be seen that each time a shift pulse is applied on line 106, each of the flip-flops 107 in shift register 78 is driven to the condition where transistor 110 is cut off. That is, if transistor 108 in one particular stage of the shift register is cut off, it is caused to conduct by the input pulse on shift line 106. In those stages where the transistor 108 is conducting, the conditions or states remain unchanged.

The output from the previous stage is then received by each of the flip-flops 107 and if a pulse is applied on line 118 from the previous stage indicative of the fact that transistor 108 of the previous stage had been cut off prior to the shift pulse, the transistor 108 of the next stage is cut off by the pulse applied to capacitor 130. It should be understood that appropriate pulse delay means are inserted between the output line 118 of the previous stage and the input to capacitor 130 of the next stage so that the flip-flops 107 which have been changed by a shift pulse have time to be stabilized prior to the reception of the output from the previous stage.

Whenever transistors 108 of the flip-flop circuits 107 are cut off, the output level on line 118 is indicative that a black portion of the document has been scanned to produce the pulse. Whereas, conduction of transistor 108 indicates that a white portion of the document has been scanned. It is, of course, to be understood that this may be reversed as the demands of the circuitry require. Thus, for ease of reference, when transistor 108 conducts and transistor 110 is cut off in one of the stages of the shift register, the stage is considered to be in a "white" state. When transistor 108 is cut off and transistor 110 conducts, the stage is considered to be in a "-black" state.

The output from the collector of transistor 108 also drives transistor 126 which produces an output on line 134 which is inverted and which drives the feature masks associated with a flip-flop stage 107. Similarly, the output voltage on the collector of transistor 110 is inverted by amplifier 128 and applied via line 136 to the feature masks associated with the stages of the flip-flop of the shift register.

As best seen in FIG. 5, the shift register 78 is connected via cable 145 to the feature extraction masks 80. Cable 145 includes the output lines 134 and 136 from each of the 1,200 flip-flops in shift register 78. The lines 134 and 136 are combinatorially applied to the plurality of masks which comprise the feature extraction masks unit 80. There are so many feature masks as there are features which must be recognized in order to identify the character which is being shifted through the shift register 78. Each feature extraction mask is connected to a plurality of flip-flops in shift register 78. The inputs may be either from the line 134 or line 136 of the flip-flops depending on the feature which is sought to be recognized. That is, if a character is sought to be recognized by a combination of the presence of various features, the recognition gate for those features are connected to line 134 of the flip-flops of the shift register 78. Whereas, the detection for the absence of a segment may be recognized by sensing the lines 136 of the various flip-flops associated with the feature.

Figure 8:
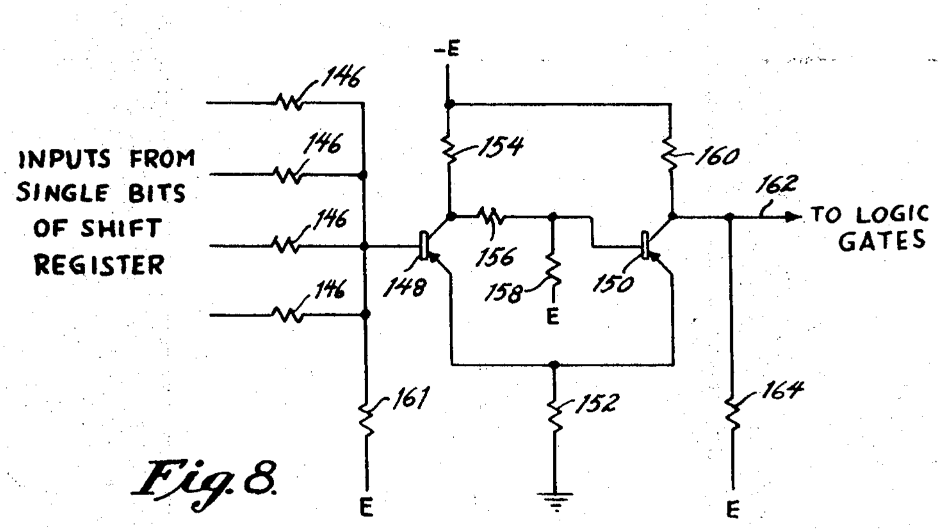
FIG. 8 is a schematic diagram of a recognition circuit used in the Feature Extraction Mask unit.

A feature mask is shown in FIG. 8. Each feature mask includes a plurality of resistors 146, the first end of which is connected to the output lines 134 or 136 of the various flip-flop stages of the shift register 78. The feature mask also includes a threshold gate which is comprised of transistors 148 and 150 and their associated circuitry. It should be understood that various combinations and pluralities of resistors may be used for a feature mask. That is, there need not be four resistors as shown, but in fact, any number from two to 60 can be used for a feature mask. However, for the most part, the average feature mask contains from four to 15 of such resistors. Resistors 146 may be weighted in value so that certain portions of a feature which are more important are given more value as an input to the base of transistor 148. Transistors 148 and 150 are preferably of the PNP type. The emitters of transistors 148 and 150 are both connected to ground via resistor 152.

The collector of transistor 148 is connected to a negative source of voltage (—E) via resistor 154 and to the base of transistor 150 via resistor 156. The base of transistor 150 is also connected to a positive source of voltage (E) via resistor 158. The collector of transistor 150 is also connected to the negative source of voltage (—E) via resistor 160. The base of transistor 148, in addition to being connected via resistor 146 to the various outputs of shift register 78, is also connected to a positive source of voltage (E) via resistor 161. The collector of transistor 150 is also connected to a positive source of voltage (E) via resistor 164. The transistors 148 and 150 are so biased by a voltage source E and —E that the transistors 148 and 150 do not conduct until a plurality of inputs are applied to resistors 146 which overcome a predetermined threshold. Thus, if a particular mask has four resistors and is adapted to be operated by inputs to any three of the four resistors 146 then the mask has a threshold which is exceeded by inputs to three of the four resistors. Thus, when the circuit receives three of the inputs, the emitter-base junction of transistor 148 is forwardly biased and therefore conducts. This enables the conduction of transistor 150 which produces as output signal on line 162. Line 162 is connected to the collector of transistor 150 and the output signal is transmitted to the logic gates which are located in the combination of features to characters unit 82. As seen in FIG. 5, the feature extraction mask unit 80 is connected to the combination of features to characters unit 82 by a cable 166 which is comprised of the output lines 162 from each of the threshold gates in the feature extraction masks.

Figure 9:
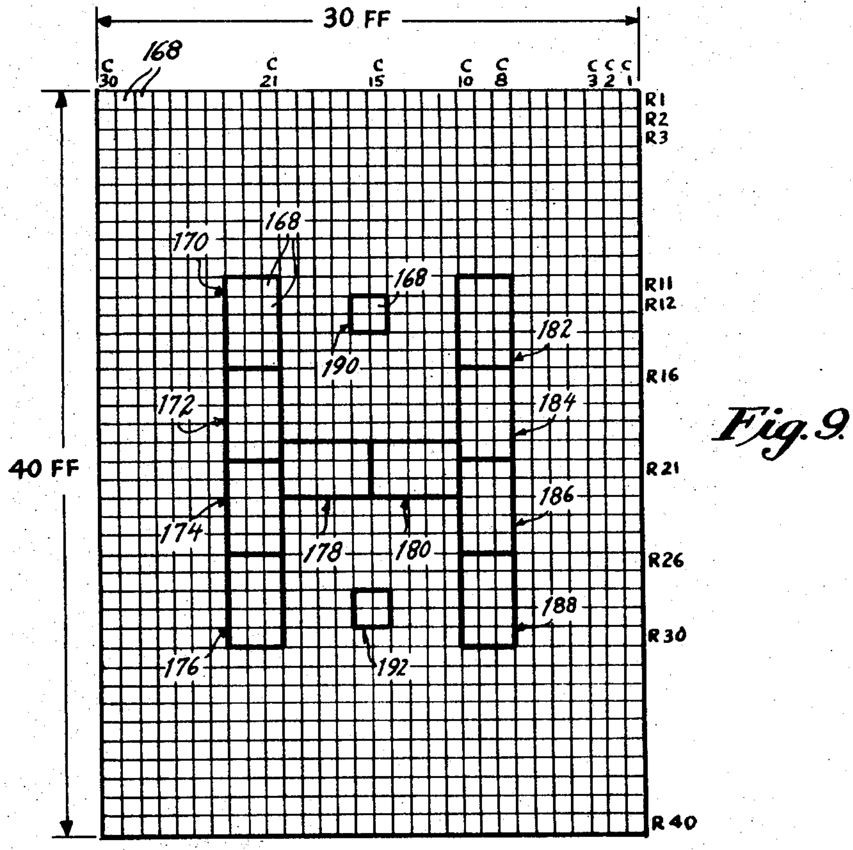
FIG. 9 is a pictorial diagram illustrative of the operation of the recognition circuits.

Referring now to FIG. 9, a character mask is diagrammatically illustrated. The diagram represents each of the feature masks used for the identification of the letter H. That is, the illustration represents the manner in which the shift register 78 is sensed in order to recognize the letter H if it is on a document and is scanned by the cathode-ray tube of a scanner unit 74.

The diagram is comprised of 30 columns of 40 blocks 168. Each block represents the stage of a flip-flop of shift register 78 to which the resistors 146 of the feature extraction masks are connected. Thus, the labels C–1 through C–30 for the columns and R–1 through R–40 for the rows correspond to the columns and rows of the shift register 78 as shown in FIG. 6. That is, the block 166 in column C–1 and row R–1 corresponds to flip-flop FF–1 in FIG. 5. Thus, if the feature mask for an H required the detection of either a white or black predominance in that particular area of the document, one of the resistors 146 of a feature mask is connected to the line 134 or 136, respectively, of flip-flop FF–1.

For the letter H, feature extraction masks are used in accordance with the pattern shown in FIG. 9. That is, the letter H is comprised of a plurality of sectors 170, 172, 174, 176, 178, 180, 182, 184, 186, 188. Each of the sectors of the letter H are five blocks long and three blocks wide and thereby encompass 15 blocks. This is representative of the fact that each feature mask which is represented by a sector in the letter H in FIG. 9 includes 15 resistors 146 which are connected to the output lines 134 of 15 stages of shift register 78. The sectors 170 to 176 extend vertically and form the left vertical bar of the letter H. Sectors 178 and 180 extend horizontally and form the central bar of the letter H, and sectors 182 through 188 extend vertically and form the right vertical bar of the letter H.

The mask for the letter H further includes a pair of sectors 190 and 192 which are each two blocks square. That is, the feature masks which are represented by each of these sectors includes four resistors 146 which are connected to the output lines 136 of four stages of shift register 78. The sectors 190 and 192 correspond to white areas on a document so that not only does the character H mask require detection of black areas on the document where the letter H would be, but also that there be white areas on the document between the vertical bars and the central horizontal bars of the H.

For each sector illustrated in the letter H mask of FIG. 9, there is a feature mask in the feature extraction masks unit 80. For example, the sector 170 is diagrammatically illustrative of a feature mask as shown in FIG. 8 having 15 resistors 146. Each of the boxes 168 within sector 170 correspond to a resistor 146 in such a feature extraction mask. The resistor corresponding to the box 168 which is disposed in column C–21 and row R–11 is connected to output line 134 of FF–311. Similarly, the box 168 which is disposed in both column C–21 and row R–12 indicates that a second resistor 146 of the feature extraction mask is connected to the output line 134 of flip-flop FF–812. In the same manner, each of the sectors 172 through 188 indicate feature extraction masks having 15 resistors 146 connected to the output lines 134 of various flip-flops throughout the shift register 78 in accordance with the location of the boxes in FIG. 9. The sectors 190 and 192 are each illustrative of feature masks having four input resistors 146. Thus, the box 168 which is disposed in both column C–15 and row R–12 indicates that the first resistor 146 in the feature mask corresponding to sector 190 is connected to output line 136 of flip-flop FF–572 which is in column C–15 and row R–12 of the shift register 78.

As the cathode-ray tube in scanner unit 74 scans a letter H on a document, the signals formed by the scanning of the letter H are shifted through shift register 78. When the signals representative of the letter H are disposed in the shift register in accordance with the boxes shown in FIG. 9, each of the feature extraction masks associated with sectors 170 through 192 should be energized to produce an output on its respective line 162.

However, it is enough that various of the extraction masks be energized. That is, it is not necessary that all of the sectors of the letter H be recognized simultaneously. For example, if either of the sectors 170 or 172 is not recognized, the letter H may still be detected if the other is present. Thus, if the print on the document is sporadic at either portion of the H corresponding to sectors 170 or 172, the letter H can still be recognized. Similarly, as will be seen hereinafter, the absence of the recognition of other of the sectors will not completely prevent recognition of the letter H.

The outputs of the feature masks corresponding to sectors 170 through 192 are fed via cable 166 to the combination of features to characters unit 82. The combination of features to characters unit 82 includes a plurality of gating circuits, tree circuits or logic circuits to convert the outputs of the various feature masks to characters. Thus, in the example of the letter H, appropriate logic circuitry may be used to mechanize the following equation to recognize the letter H:

$$H=(S170+S172)\cdot(S174+S176)\cdot(S178+S180)\cdot(S182+S184)\cdot(S186+S188)\cdot(S190\cdot S192)$$

This is a Boolean equation which is mechanized within the combination of features to characters unit 82. S170 through S192 indicate that an output signal indicative of the presence of a sector is provided on lines 162 of the feature masks associated with sectors 170 through 192, respectively.

The "+" symbol indicates the OR function and the "·" symbol indicates the AND function. It can thus be seen that each of the following conditions are necessary in the unit 82 to determine that an H has been scanned:

1. The recognition of the presence of either or both of sectors 170 and 172.

2. The recognition of the presence of either or both sectors 174 or 176.
3. The recognition of the presence of either or both of sectors 178 and 180.
4. The recognition of the presence of either or both of sectors 182 or 188.
5. The recognition of the presence of either or both of sectors 186 or 188.
6. The recognition of the presence of both sectors 190 and 192.

The detection of the character by the combination of features to characters unit 82 provides an output signal on cable 194 which is connected to the input of code generator 84. Code generator 84 converts the input from cable 194 to a binary-coded representation of the character identified or recognized by the unit 82.

The output of code generator 84 is connected to the input-output buffer unit 88 via cable 196. Cable 196 includes a plurality of lines which feed the character to the input-output buffer unit in parallel. The input-output buffer unit 88 acts as a multiplexing unit for feeding information into and out of the master control unit 86 on a time-sharing basis. Master control unit 86 is preferably a general purpose digital computer which is programmed in accordance with the requirements of the system.

The binary-coded representation of the character from code generator 84 is inserted into a temporary storage in the master control unit 86. The instruction control 76 generates the *x/y* coordinate of the area of the document at which the character H was scanned to the input-output buffer unit via the *x* coordinate and *y* coordinate lines 198 and 200, respectively. That is, the location at which the cathode-ray tube has scanned the document is fed via lines 198 and 200 to the input-output buffer unit. The location of the raster is broken into the *x* coordinate and *y* coordinate which are generated in a binary-coded form and fed to the input-output buffer unit 88 via lines 198 and 200. The input-output buffer unit 88 provides these coordinates to master control unit 86 via cable 202. Thus, not only the character which is read but the location thereof is stored together therewith in a temporary storage area of the master control unit.

It should be noted that the input-output buffer unit 88 also provides instructions to instruction control unit 76 via line 204 which is connected therebetween. The master control unit 86 provides instruction signals for distribution throughout the system via cable 202 which is connected between the input-output buffer unit and the master control unit. As hereinbefore mentioned, the input-output buffer unit 88 is a multiplexing unit which controls traffic between the remainder of the system and the master control unit 86.

Figure 12:
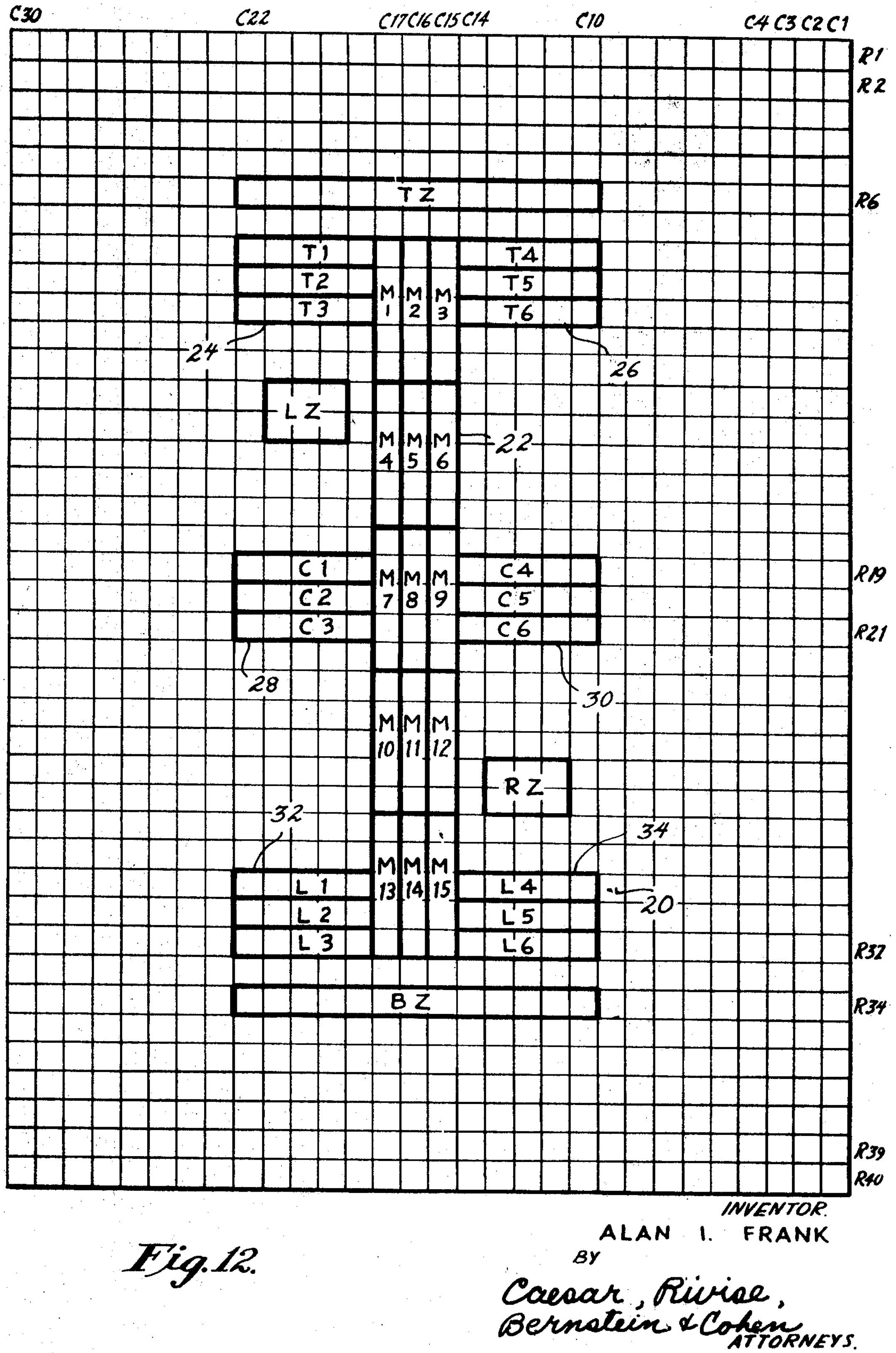
FIG. 12 is a pictorial diagram illustrative of the recognition circuits for an editing symbol.

Referring now to FIG. 12, a combination of feature masks is diagrammatically shown for the detection and the identification of editing symbols of the invention on a document. FIG. 12 diagrammatically illustrates, in the same manner as FIG. 9, the combination of feature extraction masks which comprise the means of detecting and recognizing the editing symbols on a document. The vertical bar 22 of the editing symbol 20 is comprised of 15 sectors M1 through M15. Each of the sectors is five blocks long by one block wide. Each of the sectors M1 through M15 is vertically elongated and is positioned substantially at the center of the raster. The top left horizontal bar 24 is comprised of sectors T1, T2 and T3. The top right horizontal bar 26 is comprised of sectors T4, T5 and T6. The left central horizontal bar 28 is comprised of sectors C1, C2 and C3. The right central horizontal bar 30 is comprised of sectors C4, C5 and C6. The bottom left horizontal bar 32 is comprised of sectors L1, L2 and L3. The bottom right horizontal bar 34 is comprised of sectors L4, L5 and L6. Each of the sectors T1 through L6 which comprise the horizontal bars 24 through 34, is horizontally elongated and is five blocks long by one block wide.

Each of sectors M1 through M15 represents a feature mask having five input resistors 146 which are connected to the output lines 134 of the stages of shift register 78 in accordance with the location of the boxes in FIG. 12. Each of the sectors T1 through T6, C1 through C6 and L1 through L6 that form the horizontal bars of the editing symbol 20 are illustrative of a pair of feature extraction masks each having five resistors 146 connected to the base of transistor 148. The resistors 146 of the first of each of the feature masks associated with these sectors of the symbol 20 are connected to the output lines 134 of the various stages of the shift register 78 with which they are associated. The resistors 146 of the second of the feature masks associated with these sectors are connected to the output lines 136 of the associated stages of the shift register 78. Therefore, there is a feature mask to detect both the presence or absence of any of the sectors that comprise the horizontal and vertical bars which form the editing symbol 20.

The feature masks associated with the "black" sides or outputs 134 of the associated stages of the flip-flop produce an output to indicate the presence of a sector when the area of the sector on the document is predominantly black. When a black sector is present the output on line 162 of the feature mask is labeled for use in the equations, infra, in accordance with the sector detected. Thus, if the feature mask for sector T1 detects a black sector, the presence of the sector in the Boolean equation is labeled T1.

The recognition masks which are connected to output lines 136 indicate the absence of a particular symbol or a predominantly white area on the document. Thus, in the case of the area of sector T1 being predominantly white, the output signal produced by the feature mask is labeled $\overline{T1}$. Thus, the signals produced in the feature extraction masks unit 80 by the feature extraction masks which are used to determine the presence of a black sector are labeled by the sector which they represent, whereas the feature masks which detect the absence of a black area or the presence of a white area, emit a signal indicative thereof which is labeled by the sector which they represent with a bar above it. This terminology is used throughout the equations set forth, infra.

Provided above the horizontal sectors T1 and T4 and the tops of vertical sectors M1, M2 and M3, is a horizontally extending sector TZ which is 13 blocks long and one block wide and is thus coextensive with the top of the editing symbol 20. The sector TZ is also spaced one block above the editing symbol 20. Provided below the horizontal sectors L3 and L6 and the bottoms of vertical sectors M13, M14 and M15 is a horizontally elongated sector BZ which is also 13 blocks long by one block wide. The sectors TZ and BZ are each associated with a feature extraction mask having 13 resistors 146 connected to the base of transistor 148. Each of the resistors is connected to the output line 136 of the associated stages of shift register 78. The sector TZ extends from column C-10 to C-22 on row R-6 and thus the resistors 146 are connected to stages FF-366, FF-406, FF-446, FF-486...and FF-846. The resistors 146 of the feature extraction mask associated with sector BZ are connected to the flip-flops FF—394, FF-434...and FF-874.

Provided between the horizontal bars 24 and 28 and vertical bar 22 is a sector LZ which is three blocks long and two blocks wide. Another sector RZ is provided between horizontal bars 30 and 34 and vertical bar 22 which is also three blocks long by two blocks wide. The sectors LZ and RZ are each associated with a feature mask having six resistors 146 which are connected to the lines 136 of the associated stages of shift register 78. The sectors TZ, BZ, LZ and RZ as will be seen hereinafter ensure that the signals emitted by scanning an editing symbol which are shifted through the shift register 78 are in the proper position to enable an accurate character identification.

As previously mentioned, the feature extraction masks may have weighted resistors for the characters. In the feature extraction masks used for the sectors of the horizontal and vertical bars of the editing symbol 20, the resistors 146 are substantially equal in resistance. The threshold gate associated with each of the sectors is properly biased so that it may be operated by the receipt of three bits out of five from the shift register. That is, if the cathode-ray tube scans a black area in any three of the five positions within a sector, the threshold gate of the feature mask is operated to produce a signal on line 162 of the threshold gate to indicate that a sector is present. Thus, normal variations in the line produced by a pencil or a pen does not prevent the threshold gate associated with the sector from being operated when a sector is present on the document.

TZ, LZ, RZ, AND BZ comprise a registration mask. As hereinbefore mentioned, the feature masks associated with these sectors aid in the prevention of an inaccurate identification of a character in the editing symbol masks. The feature masks associated with sectors TZ and BZ of the mask are set so that the 13 resistors 146 are similar in weight and the circuit is operated upon receipt of 10 or more signals from lines 136 of the 13 stages of the shift register 78 to which they are connected. That is, if the cathode-ray tube scans 10 white areas out of the 13 areas of the sector, the feature mask is energized. The feature masks associated with sectors LZ and RZ are set so that the presence of four or more white spots during the scan of the sector by the cathode-ray tube energizes the threshold gate of the feature mask. The feature masks of sectors LZ and RZ when energized indicate that the color of these areas on the document are predominantly white. This condition for any of the registration feature masks is represented in the following equations by a bar (i.e. $\overline{TZ}$) over the top of the sector which has been scanned. Similarly, with respect to the sectors of the editing symbol 20, the use of a bar over the top of the sector (i.e. $\overline{T1}$) indicates that the feature masks associated therewith which is connected to the lines 136 or the "white" sides of the flip-flop stages of shift register 78 have been energized due to the absence of the sector.

The bars 24 through 34 of the editing symbol 20 are recognized as present by the logic circuitry upon the recognition of either one of the three sectors in each of the horizontal bars. That is, the top left segment 24 (hereinafter referred to as TL) is recognized if the feature mask associated with either T1, T2 or T3 is energized. Similarly, the horizontal bars 26, 28, 30, 32 and 34 (hereinafter referred to as TR, CL, CR, LL, and LR, respectively) are recognized as present by the recognition of one or more of the sectors by their associated feature mask.

The circuitry for the combination of features to characters unit 82 insofar as the detection and identification of the editing symbols required in thus mechanized in accordance with the following Boolean equations:

For the Presence of the Horizontal Bars

1. $TL=T1+T2+T3$
2. $TR=T4+T5+T6$
3. $CL=C1+C2+C3$
4. $CR=C4+C5+C6$
5. $LL=L1+L2+L3$
6. $LR=L4+L5+L6$

For the Absence of the Horizontal Bars

1. $\overline{TL}=\overline{T1}\cdot\overline{T2}\cdot\overline{T3}$
2. $\overline{TR}=\overline{T4}\cdot\overline{T5}\cdot\overline{T6}$
3. $\overline{CL}=\overline{C1}\cdot\overline{C2}\cdot\overline{C3}$
4. $\overline{CR}=\overline{C4}\cdot\overline{C5}\cdot\overline{C6}$
5. $\overline{LL}=\overline{L1}\cdot\overline{L2}\cdot\overline{L3}$
6. $\overline{LR}=\overline{L4}\cdot\overline{L5}\cdot\overline{L6}$ The vertical bar 22 is formed of five groups each including three sectors. Thus, five vertical portions of the bar are sensed for these portions of the bars and are hereinafter referred to as V1, V2, V3, V4 and V5. V1 is considered to be present if the recognition mask associated with either M1, M2 or M3 is energized. Similarly, the remaining vertical portions are recognized upon recognition of one or more of the vertical sectors comprising the portion. These portions are thus detected by logic circuitry in unit 82 which is mechanized in accordance with the following Boolean equations:

1. $V1=M1+M2+M3$
2. $V2=M4+M5+M6$
3. $V1=M7+M8+M9$
4. $V4=M10+M11+M12$
5. $V5=M13+M14+M15$

If each of vertical portions $V1$ through $V5$ are present, the vertical bar 22 (hereinafter referred to as $V$) is considered to be present. Thus, the detection of $V$ is mechanized by the following equation:

$$V=V1\cdot V2\cdot V3\cdot V4\cdot V5$$

As hereinbefore mentioned, to ensure that the presence of the vertical bar and the combination of the presence and absence of horizontal bars $TL$, $TR$, $CL$, $CR$, $LL$, and $LR$ are, in fact, in the proper location at the time that the vertical bar 22 is detected, the registration mask should produce the registration signal $R$ in accordance with the following Boolean equation:

$$R=\overline{TZ}\cdot\overline{BZ}\cdot\overline{LZ}\cdot\overline{RZ}$$

It can therefore be seen that in order for the recognition masks to indicate that an editing symbol is present, not only must the vertical bar 22 be present as indicated by the signal being generated by the logic circuitry, but also the signal $R$ must be generated by the logic circuitry. If both $R$ and $V$ signals are present, it is indicative that an editing symbol of the font of editing symbols shown in FIG. 2 is present. It can be seen by the following exemplary illustrations how the logic tree is mechanized in order to identify which of the following editing symbols are scanned:

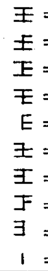

(1) $=R\cdot V\cdot TL\cdot CL\cdot LL\cdot TR\cdot CR\cdot LR$
(2) $=R\cdot V\cdot \overline{TL}\cdot CL\cdot LL\cdot TR\cdot CR\cdot LR$
(3) $=R\cdot V\cdot TL\cdot \overline{CL}\cdot LL\cdot TR\cdot CR\cdot LR$
(4) $=R\cdot V\cdot TL\cdot CL\cdot \overline{LL}\cdot TR\cdot CR\cdot LR$
(5) $=R\cdot V\cdot \overline{TL}\cdot \overline{CL}\cdot \overline{LL}\cdot TR\cdot CR\cdot LR$
(6) $=R\cdot V\cdot TL\cdot CL\cdot LL\cdot \overline{TR}\cdot CR\cdot LR$
(7) $=R\cdot V\cdot TL\cdot CL\cdot LL\cdot TR\cdot \overline{CR}\cdot LR$
(8) $=R\cdot V\cdot TL\cdot CL\cdot LL\cdot TR\cdot CR\cdot \overline{LR}$
(9) $=R\cdot V\cdot TL\cdot CL\cdot LL\cdot \overline{TR}\cdot \overline{CR}\cdot \overline{LR}$
(10) $=R\cdot V\cdot \overline{TL}\cdot \overline{CL}\cdot \overline{LL}\cdot \overline{TR}\cdot \overline{CR}\cdot \overline{LR}$ It can therefore be seen that if both the $R$ and $V$ are generated, an editing symbol is identified. It can be seen in the above equations that where a particular horizontal bar of an editing symbol on the left side of the equation is required to be present, the label representative of the bar appears on the right side of the equation. Where the bar is not present in the left side of the equation, the label representative of the bar appears on the right side of the equation with a line thereover. That is, where the top left bar 26 is present in the symbol on the left side of the equation, $TL$ appears in the right side of the equation, and where the top left bar is not present, the symbol $\overline{TL}$ appears.

When the combination of features to characters unit 82 detects an editing symbol, the output is fed on an appropriate line in cable 194 to code generator 84. Code generator 84 converts the signal from cable 194 to a binary-coded signal and feeds these signals via cable 196 to the input-output buffer unit 88.

The instruction control 76 provides via lines 198 and 200 the binary-coded signals representing the location at which the editing symbol is located on the document. The input-output buffer unit 88 transmits both the representation of the symbol and the location ($x$ and $y$ coordinates) thereof to the master control unit 86 for storage therein.

The master control unit 86 also supplies instruction signals to the instruction control 76 via line 204 and the input-output buffer unit 88 so that the document-scanning equipment may be controlled for location of scan as well as the size of the scan. The size of the scan may also be varied where the editing symbol detected does not fall within specific size limits. Thus, if the symbol is written too small, the raster produced by the cathode-ray tube is reduced. Similarly, if the editing symbol is too large, the raster is increased in size.

Figure 10:
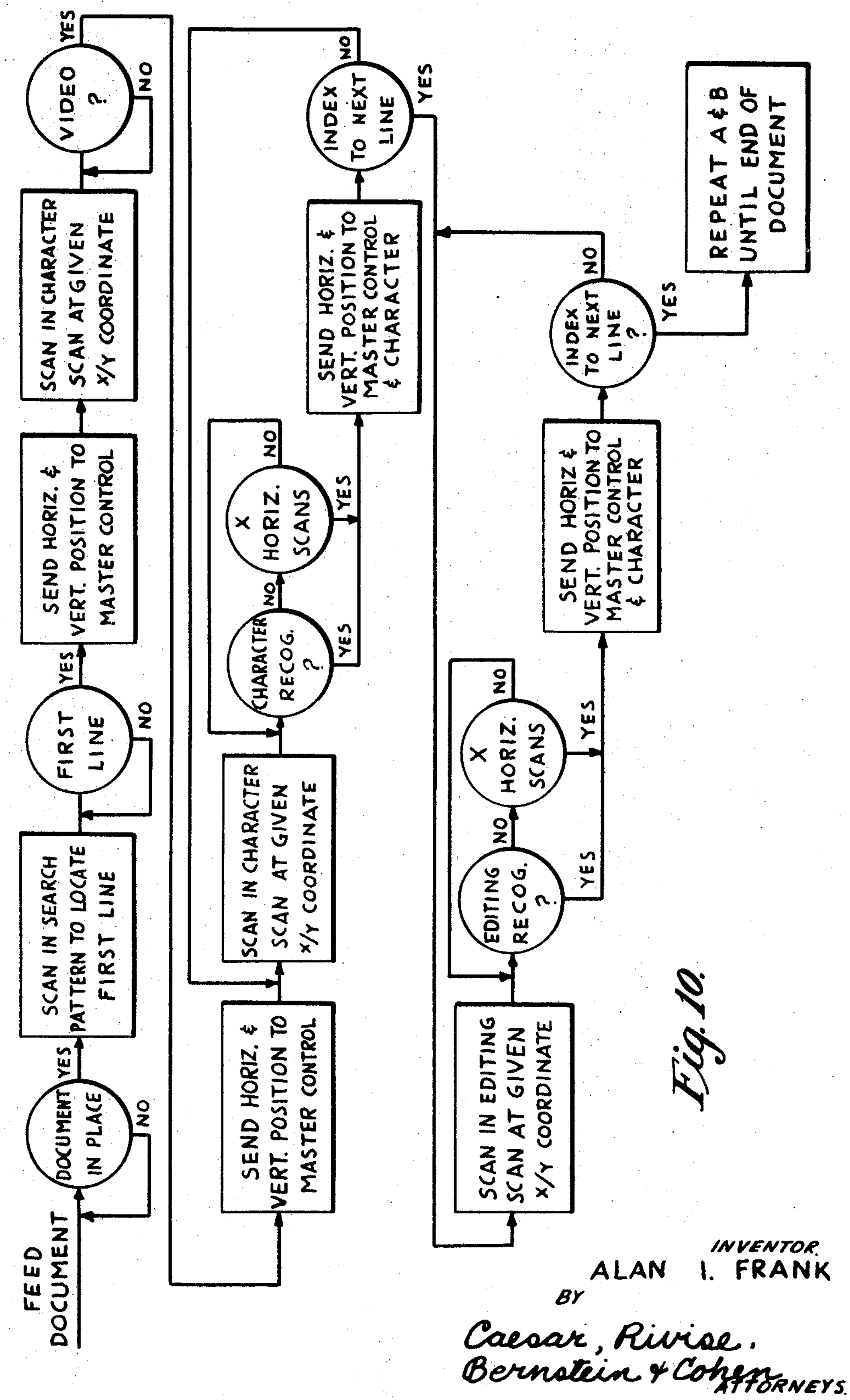
FIG. 10 is a schematic block diagram of the flow of data throughout the system.

The overall flow of operations and data within the character recognition system shown in FIG. 5 is illustrated by the schematic flow diagram in FIG. 10. As seen therein, the operation of the character recognition system is as follows:

The document to be scanned is placed into the cylindrical rotating platen of the document-handling unit 72. When the document is in place, the document-handling unit emits a signal over line 206 to the scanner unit 74 to indicate that the document is in place. If the document is not in place, the feeding apparatus of the document-handling unit 72 is operated unit the document is properly disposed.

The cathode-ray tube of the scanner unit begins to search for the first line of the document so that it can begin to optically scan the characters throughout the document. The cathode-ray tube scans in pattern to locate the first line of typewritten or printed information on the document. Until the first line is found, the cathode-ray tube continues to scan in pattern.

When the first line is detected, the horizontal and vertical position of the cathode-ray tube beam is transmitted to the master control via the instruction control 76 and the input-output buffer unit 88. When the location of the first line of the document is received by the master control unit 86, the control unit 86 instructs the scanner unit to start scanning in a character pattern at the given horizontal and vertical location (hereinafter referred to as the *x/y* coordinate). The scanner unit then begins a character scan at the *x/y* coordinate. If the scanner does not recognize video, that is, when a character is not present at the first location, the character scan is moved further along the line by the instruction control 76.

When video is detected, the *x/y* coordinate is transmitted to the master control unit 86 via the instruction control unit 76 and the input-output buffer unit 88. The character at that position is scanned by the cathode-ray tube and the output of the photomultiplier tube is fed via line 104 to the shift register 78. If a character is identified and recognized by the units 80 and 82, the character and the *x/y* coordinate of the character are stored in the master control unit.

The instruction control 76 controls the scanner unit so that the scanner unit continues the character scans along the line until the end of the line. At the end of the line, the scanner is instructed by the instruction control 76 to scan in an editing scan at the *x/y* coordinate below the previous line. The scanner continues in an editing mode until a video interrupt. That is, if there is recognition that a character does exist on the editing line, then the *x/y* coordinate is fed to the master control unit and the scanner unit begins a character scan to provide the shift register with the output signals from the photomultiplier in scanner unit 74 for determination of the editing symbol located on the line. The recognition equipment thus sends the binary-coded representation of the symbol to the master control unit for the storage with the *x/y* coordinate thereof. Instruction control 76 instructs the scanner unit to continue scanning between the lines of textual material. The process is then repeated by the scanner unit 76 at the next line of textual material and the portion of the document underneath the line for detection of instructions. This process is repeated until the end of the document whereupon an end of document signal is generated in the master control unit 66 and the document-handling unit 72 is instructed to put the next document in place for optical recognition.

Figure 11:
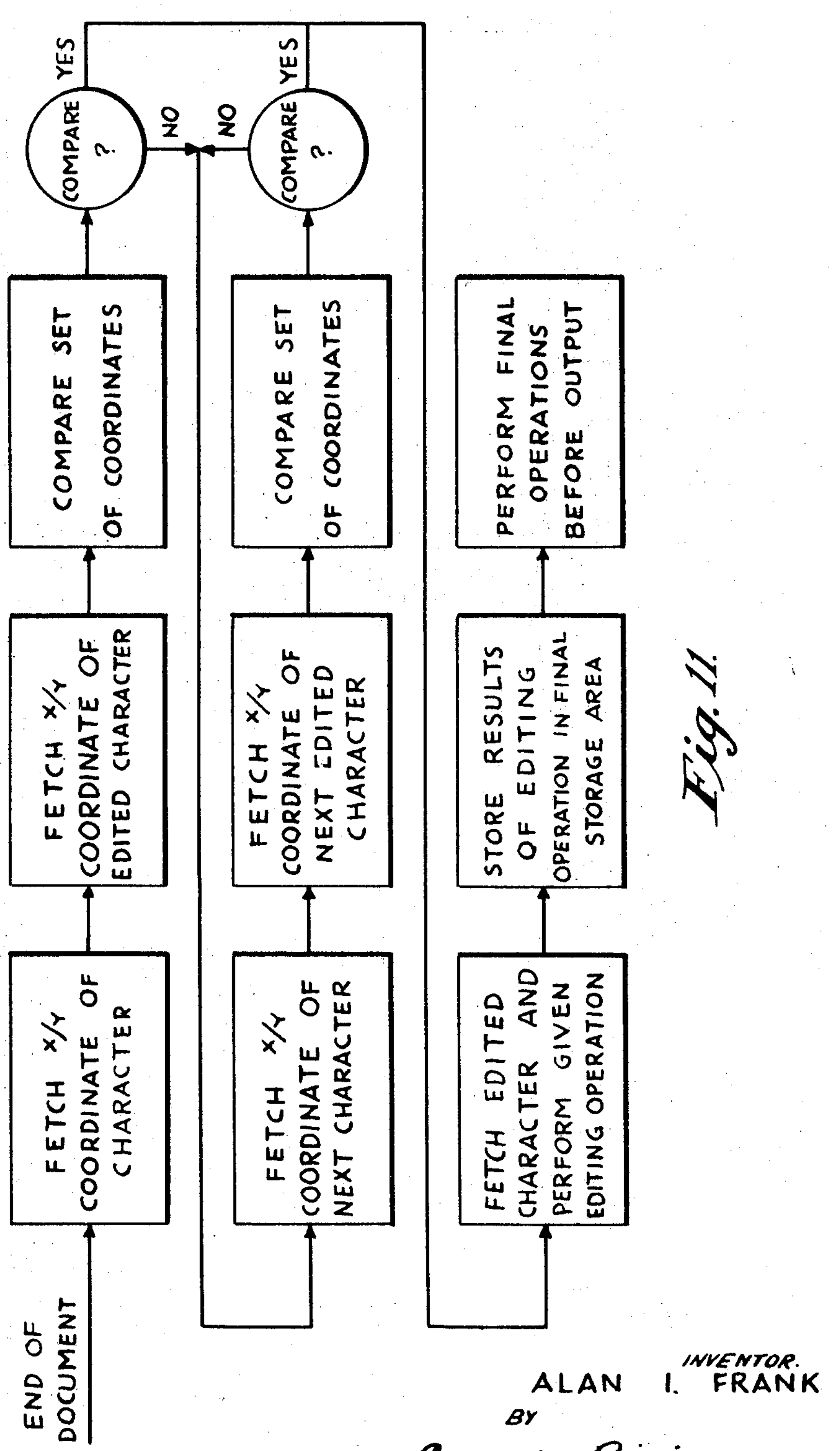
FIG. 11 is a schematic block diagram of the flow of data within a computer after a document has been scanned.

As previously mentioned, the master control unit 86 is a general-purpose digital computer. The information concerning the characters on the lines of textual material and the instruction symbols are stored in temporary storage areas of memory. Line merges are initiated by the program in the master control and the editing operation is accomplished. The editing operation is diagrammatically illustrated in FIG. 11 which is a flow chart of the information in the computer for performing the merge.

As seen therein, after the end of document signal is received, the *x/y* coordinate of the first character in the first line is fetched from the temporary memory. The *x/y* coordinate of the first editing character found is also fetched from the temporary storage associated therewith. The coordinates of the textual character and the editing character are compared. If the coordinates do not compare, that is, it is determined that the *x/y* coordinate of the editing symbol is not adjacent to the *x/y* coordinate of the textual character, than the textual character is not in error and is not changed. Then the *x/y* coordinate of the next character is fetched and the coordinates of the edited character and the textual character are compared in the same manner that the coordinates were compared in the previous comparison.

If a comparison has been made in which the *x/y* coordinates of both the textual character and the editing character are within a specified limit and therefore adjacent to each other, then the editing character is fetched and the editing operation indicated by the character is performed. The results of the editing operation is stored in the storage area along with the storage of the previous textual characters. The final operations on the stored data are then performed in accordance with the instructions which are indicated by the editing symbols representative of the graphic arts instructions. Thus, the computer organizes the proper number of letters for a line and the width of the final columns that are used in the reproduction of the textual material before the textual material is read out of the computer.

It can, therefore, be seen that a new and improved method of editing as well as a new and improved character recognition system has been shown.

The invention enables the editing of printed or typed textual material for direct insertion into a character recognition system. The need for retyping or reprinting the entire sheet in perfect form is thus obviated.

Further, the method of editing is no more time consuming than other forms of editing and the symbols used are easy to write while being machine recognizable. The edited document is then ready to be placed directly in the character recognition system which can reach the textual material as well as incorporate the alterations.

Obviously many modifications and variations in the present invention are possible in the light of the above teachings. It is, therefore, to be understood that within the scope of the appended claims, the invention may be practiced otherwise than as specifically described.

What is claimed as the invention is:

1. A character recognition system in combination with a document having textual material thereon, said character recognition system including means for scanning said document and means responsive to signals from said means for scanning for recognizing characters scanned by said means for scanning, said document including handwritten characters which are each representative of alterations to the textual material, all of said handwritten characters being taken from a font of characters generated from a basic symbol which consists of an elongated longitudinal bar having a first pair of transverse bars at one end of said elongated bar which extend to opposite sides of said elongated bar, a second pair of transverse bars disposed centrally of said elongated bar which extend to opposite sides of said elongated bar and a third pair of transverse bars at the other end of said elongated bar which extend to opposite sides of said elongated bar, each of said characters in said font including the presence of said elongated bar and a combination of the presence and absence of said transverse bars different from the other symbols of said font, all of said handwritten characters including at least said elongated bar, said elongated bar constituting the entire longitudinal extent of each of said characters whereby said character recognition system is normalized in accordance with the longitudinal extent of said elongated bar, said character recognition system thereby reading both said textual material and said handwritten characters representative of alterations to said textual material.

2. The combination of claim 1 wherein said handwritten characters are provided below the portion of the textual material which is in error.

UNITED STATES PATENT OFFICE

CERTIFICATE OF CORRECTION

Patent No. 3,611,291 Dated October 5, 1971

Inventor(s) Alan I. Frank

It is certified that error appears in the above-identified patent and that said Letters Patent are hereby corrected as shown below:

Column 1, line 15, before "printed" insert -- in a --. Column 4, line 64, "46" should read -- 56 --; line 67, after "of" insert -- the --; line 73, after "symbol" insert -- [illegible] --. Column 5, line 3, "spector" should read -- specter --; line 22, "speeding" should read -- spending --; line 25, after the symbol delete "[illegible]" and insert -- [illegible] --; line 36, after "and" insert -- the --. Column 8, line 12, "103" should read -- 108 --; line 61 "so" should read -- as -- Column 9, line 59, "166" should read -- 168 --. Column 10, line 21, "FF-311" should read -- FF-811 --. Column 13, line 45, "in", first occurrence, should read -- is --. Column 14, line 21, after "both" insert -- the --. Column 15, line 63, delete the period (.) and add -- until the end thereof whereupon the instruction control instructs the scanner to index to the nextline of the textual material. --; line 58, "66" should be -- 86 --. Column 16, line 36 "reach" should read -- read --.

Signed and sealed this 10th day of October 1972.

(SEAL)
Attest:

EDWARD M.FLETCHER,JR.
Attesting Officer

ROBERT GOTTSCHALK
Commissioner of Patents